United States Patent [19]

Ebata et al.

[11] Patent Number: 4,525,387
[45] Date of Patent: Jun. 25, 1985

[54] PROCESS FOR METALLIZING THE SURFACE OF A CERAMIC

[75] Inventors: Yoshihiro Ebata, Kawanishi; Nobuyuki Tamari, Ikeda; Yasuo Toibana, Osaka; Ryozo Hayami, Takarazuka, all of Japan

[73] Assignee: Agency of Industrial Science & Technology, Tokyo, Japan

[21] Appl. No.: 630,561

[22] Filed: Jul. 13, 1984

[30] Foreign Application Priority Data

Jul. 18, 1983 [JP] Japan ................................ 58-131575

[51] Int. Cl.$^3$ .......................... B05D 3/04; B05D 3/10
[52] U.S. Cl. .................................. 427/190; 427/193; 427/199; 427/229; 427/343; 427/344; 427/377; 427/380; 427/427
[58] Field of Search ............... 427/229, 343, 344, 377, 427/380, 427, 190, 193, 199

[56] References Cited

U.S. PATENT DOCUMENTS

| | | | |
|---|---|---|---|
| 2,891,228 | 6/1959 | Smith-Johannsen | 427/377 |
| 3,347,704 | 10/1967 | Meyer | 427/229 |
| 3,647,532 | 3/1972 | Friedman et al. | 427/229 |
| 4,126,713 | 11/1978 | DiBugnara | 427/229 |
| 4,163,074 | 7/1979 | Ebata | 427/229 |
| 4,190,458 | 2/1980 | DiBugnara | 427/229 |
| 4,191,789 | 3/1980 | Brown et al. | 427/377 |
| 4,206,251 | 6/1980 | Chen | 427/229 |
| 4,289,829 | 9/1981 | Rosetti | 427/229 |
| 4,327,131 | 4/1982 | Branovich et al. | 427/229 |

*Primary Examiner*—Michael R. Lusignan
*Assistant Examiner*—Janyce A. Bell
*Attorney, Agent, or Firm*—Armstrong, Nikaido, Marmelstein & Kubovcik

[57] ABSTRACT

A process for metallizing the surface of a ceramic is provided. The surface of a ceramic is coated with a mixture of $SiO_2$ and at least one copper compound selected from the group consisting of copper carbonate, copper sulfate, copper sulfide, copper oxide, and copper chloride. Thereafter, the film is heated at 900° to 1300° C. in an oxidizing atmosphere to form a baked layer on the surface of the ceramic. The ceramic having the baked layer formed thereon is subjected to a reduction treatment to form a copper-metallized layer on the surface of the ceramic.

13 Claims, No Drawings

PROCESS FOR METALLIZING THE SURFACE OF A CERAMIC

BACKGROUND

This invention relates to a process for metallizing the surface of a ceramic, and more particularly relates to a process for metallizing the surface of a ceramic by a simple operation.

When a ceramic is to be used as a construction material, it must be bonded to a metal in most case because it is brittle and susceptible to impact though it has excellent heat resistance, abrasion resistance, and insulating property. In this case, it is necessary to metallize the surface of a ceramic before it is bonded to a metal. Also when a ceramic is to be used as a conductive material, its surface must be metallized before use.

Conventionally known processes for metallizing ceramics include, for example, Mo-Mn method, active metal method, hydrogen compound method, glass solder method, and silver carbonate method.

However, the Telefunken method is one comprising coating the surface of a ceramic with molybdenum-manganese, baking it at a temperature of as high as 1400° to 1700° C. in a non-oxidizing atmosphere, plating the surface with metal, and reheating it in a non-oxidizing atmosphere in order to stabilize the formed plating and, if desired, brazing a metal to the plating and so it has drawbacks of a high heating temperature as well as long and complicated working steps.

On the other hand, the methods other than the Telefunken method have a problem in that the bonding strength, thermalshock resistance, chemical resistance, etc., of a metallized layer are not satisfactory in addition to a problem of a complicated process.

SUMMARY

It is a first object of this invention to provide a process for metallizing the surface of a ceramic by a simple operation.

It is a second object of this invention to provide a process for metallizing the surface of a ceramic which can be performed in a short working step and baking at relatively low temperatures.

It is a third object of this invention to provide a process for forming a metallized layer excellent in electrical conductivity, bonding strength to ceramics, uniformity, smoothness, and gloss on the surface of a ceramic.

These objects of this invention can be achieved by coating the surface of a ceramic with a mixture of $SiO_2$ and at least one copper compound selected from the group consisting of copper carbonate, copper sulfate, copper sulfide, copper oxide and copper chloride, heating the formed coating at a temperature of 900° to 1300° C. in an oxidizing atmosphere to form a baked layer on the surface of the ceramic and then subjecting the ceramic having the baked layer formed thereon to a reduction treatment to form a copper-metallized layer on the surface of the ceramic.

THE PREFERRED EMBODIMENTS

According to this invention, the surface of a ceramic is first coated with a mixture of $SiO_2$ and a copper compound selected from the group consisting of copper carbonate, copper sulfate, copper sulfide, copper oxide and copper chloride.

Copper carbonate, copper sulfate, copper sulfide, copper oxide and copper chloride are used usually in the form of a powder, and so is also $SiO_2$.

In this invention, a joint-use is made of a copper compound and $SiO_2$ as a coating layer, which makes possible to prevent unevenness of a baked layer, improve the uniformity of a metallized layer as well as improve the smoothness and gloss of the surface of a metallized layer.

The ratio of the copper compound and $SiO_2$ is usually such that at least one copper compound selected from the group consisting of copper carbonate, copper sulfate, copper sulfide, copper oxide, and copper chloride is 95 to 50% by weight and $SiO_2$ is 5 to 50% by weight based on the total of $SiO_2$ and at least one copper compound selected from the group consisting of copper carbonate, copper sulfate, copper sulfide, copper oxide, and copper chloride, and preferably said at least one copper compound is 90 to 70% by weight and $SiO_2$ is 0 to 30% by weight.

When the amount of $SiO_2$ is below 5% by weight, the smoothness and gloss of the surface of a metallized layer becomes insufficient in some cases, while when it exceeds 50% by weight, the electrical conductivity of a metallized layer tends to decrease unfavorably.

According to this invention, it is also possible to add sodium fluoride to the above-mentioned mixture containing $SiO_2$ and said at least one copper compound.

Sodium fluoride is also used usually in the form of powder, and its amount of use is usually 5 to 0% by weight, preferably 8 to 12% by weight, based on the mixture containing $SiO_2$ and said at least one copper compound.

The addition of sodium fluoride makes it possible to heighten the bonding strength between a metallized layer and a ceramic.

According to this invention, the mixture containing $SiO_2$ and at least one copper compound selected from the group consisting of copper carbonate, copper sulfate, copper sulfide, copper oxide, and copper chloride and, if desired, sodium fluoride may be used in the form of powder as such, or may be used in the form of paste prepared by using a suitable amount of, for example, a printing ink such as screen oil, or balsam.

Namely, the mixture in the form of powder or paste is applied to the surface of a ceramic to be metallized by spraying or painting.

The amount of the mixture to be applied is not particularly limited and determined suitably according to the desired thickness of a metallized layer.

According to this invention, the ceramic thus coated is heated in an oxidizing atmosphere to bake the coating layer and form a baked layer on the surface of the ceramic.

The oxidizing atmosphere need not be a special one, and air, a mixture of air with nitrogen, or the like may be used satisfactorily.

Although the heating condition varies with the shape and size of a ceramic and the kind and amount of a coating mixture used, etc., it usually includes a temperature of 900° to 1300° C. and a heating time of 5 to 60 minutes.

When this heating is performed, copper oxide forms a glass phase according to the reaction of Cuo with $SiO_2$, which then adheres to the ceramic. On the other hand, copper carbonate, copper sulfate, copper sulfide, or copper chloride is oxidized into copper oxide, and therefore a baked layer consisting mainly of copper oxide adheres to the ceramic.

During this heating, a melt of copper oxide is partially penetrated into a ceramic, so that the bonding strength between the baked layer and the ceramic is heightened.

When the heating temperature is lower than 900° C. the above penetration does not occur, and the bonding strength becomes insufficient, while when it is higher than 1300° C., the baked layer loses its viscosity and undergo flowing, and such temperatures are not desirable.

According to this invention, the uniformity of a metallized layer and the smoothness and gloss of its surface are heightened markedly since $SiO_2$ is added to the coating layer. After baking, the ceramic having the baked layer formed thereon is reduced.

The method of reduction is not particularly limited, and any processes that can secure the reduction of copper oxide into metallic copper may be used. For example, mention can be made of heating in a reducing atmosphere of, for example, hydrogen or carbon monoxide, or immersion in a reducing organic solvent such as an alcohol, for example, ethanol, methanol, or propanol, benzene or formalin.

The temperature of heating in a reducing atmosphere is preferably lower than the baking temperature in order to prevent decomposition, degradation, etc., of a baked layer, and it is usually 200° to 900° C.

The heating time is usually 5 to 60 minutes.

In carrying out the immersion in a reducing solvent, the ceramic having the baked layer formed thereon is heated to usually 50° to 500° C., preferably to about 300° C., and then immersed in the above reducing solvent for 10 to 60 seconds.

By the above reduction treatment, a copper-metallized layer having an extremely excellent electrical conductivity is formed on the surface of the ceramic.

If desired, a variety of metals can easily be bonded to the thus metallized ceramic by, for example, brazing.

The ceramics which can be metallized by the process of this invention are not particularly limited and include, for example, non-oxide type ceramics such as silicon nitride, sialon, silicon carbide, and aluminum nitride, and oxide type ceramics such as lumina, zirconia, mullite, beryllia, magnesia, and cordierite.

This invention is quite effective in that a metallized layer can be formed on the surface of a ceramic by an extremely simple operation which includes baking at a temperature which is lower than those in conventional processes, and a reduction treatment, and that the formed metallized layer has excellent electrical conductivity, and a high bonding strength, and excellent uniformity, especially surface smoothness and gloss, and therefore have high commercial values.

The ceramics metallized by the process of this invention have the above-mentioned properties, and therefore they are usually used for electronic parts such as ceramic packages, abrasion-resistant parts, and heat-resistant parts, prepared from ceramics.

This invention will now be described in more detail with reference to examples.

EXAMPLE 1

10 parts by weight of balsam was mixed with 100 parts by weight of a mixture containing 80% by weight of copper sulfide powder and 20% by weight of $SiO_2$ powder to form a paste. This paste was applied at 0.1 g/cm² to each of flat square plates of silicon nitride ($Si_3N_4$), sialon, silicon carbide (SiC), alumina, and zirconia.

Then, these plates were placed in an electric furnace and baked in an atmosphere of air at 1100° C. for 30 minutes to form baked layers. The obtained layers were allowed to stand to cool, then heated to 300° C. in a dryer, and immersed in commercially available ethanol. By carrying out this immersion, the baked layers were reduced and metallized layers of metallic copper were formed. Table 1 shows the electric resistances of the metallized layers before and after the reduction measured at a voltage of 1000 V. It was found that the metallized layers after reduction had extremely excellent electrical conductivities.

Each of the ceramic having the thus obtained metallized layers was brazed to a copper piece with silver solder, and the bonding strengths of the metallized layers were measured by using a tensile tester having a weighing capacity of 2 tons and operated at a loading rate of 5 mm/min, and the strengths were all found to be extremely high. Table 1 shows the results.

TABLE 1

| Ceramics | Electric resistance (Ω) | | bonding strength (kg/cm²) |
| --- | --- | --- | --- |
| | before reduction | after reduction | |
| Silicon nitride | $2.0 \times 10^8$ | 0 | 247 |
| Sialon | $2.1 \times 10^8$ | 0 | 401 |
| Silicon carbide | $1.7 \times 10^8$ | 0 | 420 |
| Alumina | $1.1 \times 10^8$ | 0 | 730 |
| Zirconia | $1.2 \times 10^8$ | 0 | 740 |

Further, the obtained metallized layers were excellent in uniformity, especially surface smoothness and gloss, and had high commercial values.

We claim:

1. A process for metallizing the surface of a ceramic comprising the steps of coating the surface of the ceramic with a mixture of $SiO_2$ and at least one copper compound selected from the group consisting of copper carbonate, copper sulfate, copper sulfide, copper oxide and copper chloride, heating the coated ceramic at 900° to 1300° C. in an oxidizing atmosphere to form a baked layer on said surface of the ceramic, and then subjecting the ceramic having the baked layer formed thereon to a reduction treatment to form a copper-metallized layer on said surface of the ceramic.

2. A process for metallizing the surface of a ceramic as defined in claim 1, wherein the copper compound is present in an amount of 95 to 50% by weight and $SiO_2$ is present in an amount of 5 to 50% by weight in the mixture containing the copper compound and $SiO_2$.

3. A process for metallizing the surface of a ceramic as defined in claim 1, wherein the copper compound is present in an amount of 90 to 70% by weight and $SiO_2$ is present in an amount of 10 to 30% by weight in said mixture containing $SiO_2$ and the copper compound.

4. A process for metallizing the surface of a ceramic as defined in claim 1, wherein sodium fluoride is added to the mixture containing $SiO_2$ and the copper compound.

5. A process for metallizing the surface of a ceramic as defined in claim 4, wherein the amount of sodium fluoride is 5 to 30% by weight, based on the mixture of $SiO_2$ and the copper compound.

6. A process for metallizing the surface of a ceramic as defined in claim 4, wherein the amount of sodium fluoride is 8 to 12% by weight, based on the mixture of SiO$_2$ and the copper compound.

7. A process for metallizing the surface of a ceramic as defined in claim 1, wherein the surface of a ceramic is coated by spraying the mixture of SiO$_2$ and the copper compound in the form of powder over the surface of the ceramic.

8. A process for metallizing the surface of a ceramic as defined in claim 1, wherein a paste is formed by adding a binder to the mixture of SiO$_2$ and the copper compound, and the surface of a ceramic is coated with this case.

9. A process for metallizing the surface of a ceramic as defined in claim 8, wherein the binder is a printing ink or balsam.

10. A process for metallizing the surface of a ceramic as defined in claim 1, wherein said reduction treatment comprises heating in a reducing atmosphere.

11. A process for metallizing the surface of a ceramic as defined in claim 1, wherein said reduction treatment comprises immersion, after heating, of the ceramic having the baked layer formed thereon in a reducing organic solvent.

12. A process for metallizing the surface of a ceramic as defined in claim 10, wherein the heating temperature is 200° to 900° C.

13. A process for metallizing the surface of a ceramic as defined in claim 11, wherein the heating temperature is 200° to 500° C.

* * * * *